(12) United States Patent
Garud et al.

(10) Patent No.: US 10,268,901 B2
(45) Date of Patent: Apr. 23, 2019

(54) QUASI-PARAMETRIC OPTICAL FLOW ESTIMATION

(71) Applicant: Texas Instruments Incorporated, Dallas, TX (US)

(72) Inventors: Hrushikesh Tukaram Garud, Maharashtra (IN); Manu Mathew, Bangalore (IN); Soyeb Noormohammed Nagori, Karnataka (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 67 days.

(21) Appl. No.: 15/081,118

(22) Filed: Mar. 25, 2016

(65) Prior Publication Data

US 2017/0161565 A1 Jun. 8, 2017

(30) Foreign Application Priority Data

Dec. 4, 2015 (IN) .......................... 6508/CHE/2015

(51) Int. Cl.
*G06K 9/00* (2006.01)
*G06K 9/52* (2006.01)
(Continued)

(52) U.S. Cl.
CPC ..... *G06K 9/00791* (2013.01); *G06K 9/00758* (2013.01); *G06K 9/52* (2013.01);
(Continued)

(58) Field of Classification Search
CPC .. G06K 9/00791; G06K 9/00758; G06K 9/52; G06T 7/20; G06T 7/60; G06T 2207/20032; H04N 19/53
See application file for complete search history.

(56) References Cited

U.S. PATENT DOCUMENTS 9,792,696 B2 * 10/2017 Hepper ................... G06T 7/207
2004/0017507 A1   1/2004 Clayton
(Continued)

FOREIGN PATENT DOCUMENTS

DE   102012023060   6/2014

OTHER PUBLICATIONS

IEEE Transactions on Pattern Analysis and Machine Intelligence, "A Coarse-to-Fine Strategy for Multiblass Shape Detection", Yali Amit, Donald Geman, and Xiaodong Fan, vol. 26, No. 12, Dec. 2004, pp. 1606-1621.
(Continued)

*Primary Examiner* — Yon J Couso
(74) *Attorney, Agent, or Firm* — Ronald O. Neerings; Charles A. Brill; Frank D. Cimino

(57) ABSTRACT

An image processing system includes a processor and optical flow (OF) determination logic for quantifying relative motion of a feature present in a first frame of video and a second frame of video that provide at least one of temporally and spatially ordered images with respect to the two frames of video. The OF determination logic configures the processor to implement performing OF estimation between the first frame and second frame using a pyramidal block matching (PBM) method to generate an initial optical flow (OF) estimate at a base pyramid level having integer pixel resolution, and refining the initial OF estimate using at least one pass of a modified Lucas-Kanade (LK) method to provide a revised OF estimate having fractional pixel resolution.

24 Claims, 9 Drawing Sheets

(51) Int. Cl.
  *H04N 19/53* (2014.01)
  *G06T 7/238* (2017.01)
  *G06T 7/269* (2017.01)
  *G06T 7/223* (2017.01)
  *G06T 7/207* (2017.01)

(52) U.S. Cl.
  CPC .............. *G06T 7/207* (2017.01); *G06T 7/223* (2017.01); *G06T 7/238* (2017.01); *G06T 7/269* (2017.01); *H04N 19/53* (2014.11); *G06T 2207/10016* (2013.01); *G06T 2207/20016* (2013.01); *G06T 2207/20032* (2013.01)

(56) References Cited

U.S. PATENT DOCUMENTS

| | | | |
|---|---|---|---|
| 2005/0041842 A1* | 2/2005 | Frakes | G06K 9/3216 382/128 |
| 2005/0162565 A1 | 7/2005 | Zhen et al. | |
| 2005/0201626 A1* | 9/2005 | Kang | G06T 7/20 382/236 |
| 2010/0172545 A1* | 7/2010 | Lim | G01S 17/023 382/106 |
| 2013/0076915 A1* | 3/2013 | Ramachandran | G06T 7/2066 348/207.1 |
| 2015/0365696 A1 | 12/2015 | Garud et al. | |

OTHER PUBLICATIONS

Simon Baker, et al., "Lucas-Kanade 20 Years on: A Unifying Framework", International Journal of Computer VIS, Kluwer Academic Publishers, Norwell, US, vol. 56, No. 3, Jan. 1, 2004, pp. 221-255, XP007912875, ISSN: 0920-5691.

Saui Thurtowgood, et al., "A Biologicaiiy Inspired, Vision-Based Guidance System for Automatic Landing of a Fixed-Wing Aircraft: Automatic Landing of a of Fixed-Wing Aircraft", Journal of Field Robotics, vol. 31, No. 4, Jul. 1, 2014, pp. 699-727, XP055512238, US, ISSN: 1556-4959, DOI: 10.1002/rob.21527.

Fortun Danis, et al., "Optical Flow Modelng and Computation: A Survey", Complier Vision and Image Understanding, Academic Press, US, vol. 134, Feb. 25, 2015, pp. 1-21, XP029124767, ISSN: 1077-3142, DOI: 10.1016/J.CVIU, 2015.02.008.

J-Y Bouguet: "Pyramidal Implementation of the Lucas Kanade Feature Tracker, Description of the Algorithm", Intel Corporation, Microprocessor Research Labs, Technical Report, Jan. 1, 1999, pp. 1-9, XP002536058.

* cited by examiner

QUASI-PARAMETRIC OPTICAL FLOW ESTIMATION

CROSS REFERENCE TO RELATED APPLICATIONS

This application claims priority to Indian Provisional Patent Application No. 6508/CHE/2015 filed on Dec. 4, 2015, which is hereby incorporated herein by reference in its entirety.

CROSS-REFERENCE TO COPENDING APPLICATIONS

This application has subject matter related to copending application Ser. No. 14/737,904 entitled "Optical flow determination using pyramidal block matching" filed on Jun. 12, 2015.

FIELD

Disclosed embodiments relate to optical flow estimation including the use of pyramidal block matching.

BACKGROUND

The observed motion of objects in sequence of images due to relative motion between an optical sensor, such as a camera, and the objects present in the image is termed optical flow or optic flow. The term optical flow is generally applied in the computer vision domain to incorporate related techniques from image processing and control of navigation, such as motion detection, object segmentation, time-to-contact information, focus of expansion calculations, luminance, motion compensated encoding, and stereo disparity measurement. Such techniques are of special interest in automotive driver assist systems, robotics, and other applications that apply machine vision.

Searching for the best matching patch between two arrays of image data is a needed step in image processing. For example, some stereoscopic imaging systems compute the disparity between left and right images by finding a two-dimensional (2D) patch in the right image that best matches a given 2D patch in the left image. In another example, the alignment of two three-dimensional (3D) point clouds may be accomplished by searching for the best 3D patch matches between the volumes. In another example, video compression algorithms may determine motion between two consecutive images using an optical flow algorithm which matches patches between the two images.

A coarse-to-fine resolution pyramid approach can be used for optical flow algorithm matching. In general, in a pyramid approach, an initial search is performed at a lower resolution than the original images and the initial search result is then refined at one or more higher resolutions. The number of resolution levels in the search pyramid is implementation dependent. The use of a pyramidal search approach is generally faster and more tolerant to local minima as compared to an exhaustive search at high resolution.

Camera-based systems use a variety of computer vision (CV) technologies to implement advanced driver assistance systems (ADAS) that are designed to increase driver's situational awareness and road safety by providing essential information, warning and automatic intervention to reduce the possibility or severity of an accident. Governmental safety regulations and independent rating systems are driving development and wider adoption of the ADAS where camera based systems are emerging as a key differentiator by original equipment manufacturers (OEMs). Camera-based systems are being widely adopted in ADAS for their reliability robustness, ability to support various applications, and most importantly flexibility to support more and more ADAS applications in future. The CV techniques represent a complex, high-performance, and low-power compute problem, especially, the low level CV techniques that extract high definition, high density depth (stereo) and motion (optical flow) information from camera images.

SUMMARY

This Summary briefly indicates the nature and substance of this Disclosure. It is submitted with the understanding that it will not be used to interpret or limit the scope or meaning of the claims.

Disclosed embodiments include image processors having optical flow logic which implements a quasi-parametric optical flow measurement (QP-OFM) algorithm which combines a pyramidal block matching (PBM) method, which is a non-parametric approach, with a modified Lucas-Kanade (LK) method, which is a parametric approach, to obtain highly precise estimation over large optical flow (OF) range. The PBM method performs the OF estimation with integer pixel resolution and then at least one pass of the modified LK method is used to refine the PBM obtained OF estimate to obtain a revised optical flow estimate with fractional pixel resolution. One pass of the modified LK method generally provides a good cost benefit balance as it does not need interpolation and a data re-fetch.

Disclosed embodiments include an image processing system that includes a processor and OF determination logic for quantifying relative motion of a feature present in a first frame of video (e.g., a query image) and a second frame of video (e.g., a reference image) that provide at least one of temporally and spatially ordered images with respect to the two frames of video. The OF determination logic configures a processor to implement performing OF estimation between the first frame and second frame using a PBM method to generate an initial OF estimate at a base (lowest) pyramid level having integer pixel resolution, and refining the initial OF estimate using a modified LK method to provide a revised OF estimate having fractional pixel resolution. The QP-OFM algorithm significantly simplifies and improves upon known PBM-based dense OF (DOF) estimation algorithms. The Examples section described below demonstrates improved performance relative to known DOF estimation algorithms.

BRIEF DESCRIPTION OF THE DRAWINGS

Reference will now be made to the accompanying drawings, which are not necessarily drawn to scale, wherein.

DETAILED DESCRIPTION

Figure 1:
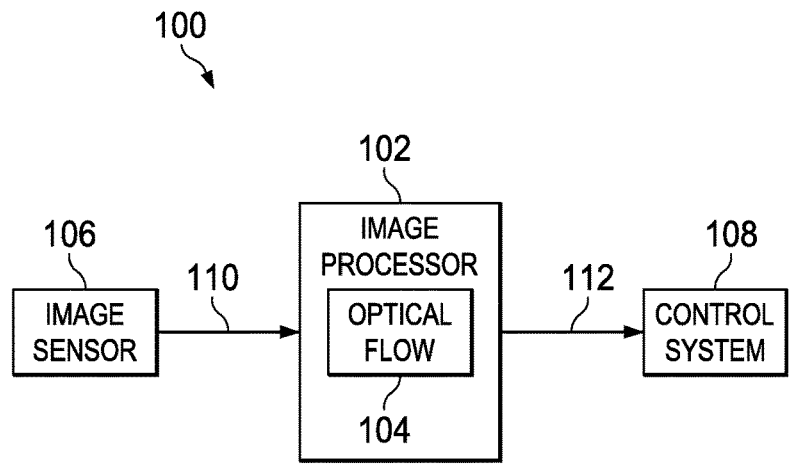
FIG. 1 is block diagram for a system which implements a disclosed QP-OFM algorithm that determines and applies an OF, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 shows a block diagram for a system 100 that determines and applies OF in accordance with various disclosed embodiments. The system 100 includes at least one image sensor 106, an image processor 102, and a control system 108. The image processor 102 can be a microprocessor, digital signal processor (DSP), or microcontroller unit (MCU). The image processor 102 includes one or more processors and storage. The image sensor 106 may include a charge coupled device (CCD), a complementary metal oxide semiconductor (CMOS) image sensor, or other photodetector for converting light into electrical signals. The image sensor 106 may include a plurality of photodetectors arranged in a two-dimensional array. The image sensor 106 may periodically capture an image representative of the field of view of the image sensor 106. For example, the image sensor 106 may capture 15, 30, 60, or any suitable number of images per second. The image sensor 106 may be incorporated in a digital video camera. Some disclosed embodiments may include multiple image sensors 106, such as when using a plurality of image sensors 106.

The images captured by the image sensor 106 may be provided to the image processor 102 as one or more arrays of binary values, where each binary value may represent an intensity or color of light detected at a particular photodetector of the image sensor 106 (i.e., a picture element (pixel)). Each image provided to the image processor 102 by the image sensor 106 may be referred to as a frame. The image processor 102 analyzes or manipulates the images 110 received from the image sensor 106 to extract information from the images 110. The image processor 102 includes OF determination logic (optical flow logic) shown in FIG. 1 as "optical flow" 104 that analyzes the images 110 received from the image sensor 106 to measure optical flow of the various elements or features present in the images 110. As noted above, disclosed image processors 102 can be implemented by a HWA.

The optical flow logic 104 applies a disclosed QP-OFM algorithm which as noted above combines the PBM method with a modified LK method to obtain accurate and precise OF estimation over a large range (i.e., a variety of different distance values). The PBM method performs the OF estimation with integer pixel resolution and then at least one pass of the modified LK method is used to refine the obtained OF estimate to get a revised OF estimate having fractional pixel resolution. The refined optical flow estimate may be filtered using a post processing filter to filter out potentially noisy estimates. In the below described HWA implementation, only one modified LK pass is generally used. However, in other implementations it is generally best to balance between computation complexity and benefit as using more number of iterations may need interpolation and repeated fetching of pixel data from memory.

The PBM method as used herein refers to an OF estimation method which converts each of the frames of video into a hierarchical image pyramid. The image pyramid comprises a plurality of image levels. Image resolution is reduced at each higher one of the image levels. For each image level and for each pixel in the first frame, a processor is configured to establish an initial estimate of a location of the pixel in the second frame to a predefined value or to a candidate position that minimizes a cost function, and to apply a plurality of sequential searches, starting from the initial estimate that minimizes the cost function and establishes a refined estimate of the location of the pixel in the second frame.

The LK method as used herein refers to a modified version of a differential OF estimation method developed by Bruce D. Lucas and Takeo Kanade. The LK method assumes that the optical flow is essentially constant in a local neighborhood of the pixel under consideration, and solves the basic optical flow equations for all the pixels in that neighborhood, by the least squares criterion. By combining information from several nearby pixels, the LK method can resolve the inherent ambiguity of the optical flow equation.

The LK method can solve the OF equation defined for a pixel in the image using the gradient information from the neighborhood of that pixel and the least squares principle, using the following relation:

$$\begin{bmatrix} U \\ V \end{bmatrix} = \begin{bmatrix} \Sigma\Sigma G_x \circ G_x & \Sigma\Sigma G_x \circ G_y \\ \Sigma\Sigma G_x \circ G_y & \Sigma\Sigma G_y \circ G_y \end{bmatrix}^{-1} \times \begin{bmatrix} \Sigma\Sigma - G_x \circ G_t \\ \Sigma\Sigma - G_y \circ G_t \end{bmatrix}$$

where the horizontal and vertical flow components are U and V respectively, $G_x$, $G_y$ the horizontal and vertical spatial gradients computed over for the first frame, and $G_t$ is the temporal gradient computed between the two images between which the OF is estimated. The conventional LK method computes the OF pixel by pixel in each iteration after performing warping (motion compensating) of the second image. Gx, Gy are defined for all pixels over a n×n (n=3,5,7 etc.) neighborhood of a pixel and '∘' operator defines the element wise multiplication of the 2D vectors. If the 2×2 matrix in the above equation is non invertible, that is if its determinant is zero, it can be regularized or U and V may be set to zero.

Regarding the modified LK method used by disclosed QP-OFM algorithms, the inputs are the same Gx, Gy and Gt as described above but are computed during a step search process (described below) to obtain horizontal and vertical flow components U and V respectively. The U and V flow components being real numbers are represented in fixed point representation, such as with 4 bits assigned for storing the fractional part. These flow values represent the incremental refinement that an existing OF estimate $F_1^{int}$ (obtained by PBM method at integer pixel resolution) referred to as "an initial OF estimate" in method 200 described below, which undergoes processing to achieve a "revised OF estimate" in method 200 having higher accuracy with fractional pixel resolution. The values of U and V can be clamped within [−1, 1] range before they are added into the existing flow estimates to obtain the final flow output $F_1$. This operation can be represented in equation form as:

$$F_1 = F_1^{Int} + \text{clamp}((U,V), -1, 1)$$

In one implementation, U and V computation followed by clamp operation in fixed point (including the division operation involved in the inverse matrix computation using an adjugate of the matrix) can be implemented using only simple integer arithmetic operations of multiplication, addition and comparison as shown below.

$$U = \begin{cases} 0 & \text{if } D = 0 \text{ or } |D| > 16 \times |N_U| \\ 1 & \text{if } |N_U| \geq |D| \\ \underset{fF}{\arg\min} \|N_U| - fF \times |D|\| & \text{otherwise} \end{cases}$$

$$Sign_U = \begin{cases} - & \text{if } \text{sign}(N_U) \neq \text{sign}(D) \\ + & \text{otherwise} \end{cases}$$

$$V = \begin{cases} 0 & \text{if } D = 0 \text{ or } |D| > 16 \times |N_V| \\ 1 & \text{if } |N_V| \geq |D| \\ \underset{fF}{\arg\min} \|N_V| - fF \times |D|\| & \text{otherwise} \end{cases}$$

$$Sign_U = \begin{cases} - & \text{if } \text{sign}(N_U) \neq \text{sign}(D) \\ + & \text{otherwise} \end{cases}$$

Where $$D = \Sigma\Sigma G_x \circ G_x \times \Sigma\Sigma G_y \circ G_y - (\Sigma\Sigma G_x \circ G_y)^2$$

$$N_U = -\Sigma\Sigma G_y \circ G_y \times \Sigma\Sigma G_x \circ G_t + \Sigma\Sigma G_x \circ G_y \times \Sigma\Sigma G_y \circ G_t$$

$$N_V = \Sigma\Sigma G_x \circ G_y \times \Sigma\Sigma G_x \circ G_t - \Sigma\Sigma G_x \circ G_x \times \Sigma\Sigma G_y \circ G_t$$

and $$fF \in \begin{Bmatrix} 0.9375, 0.8750, 0.8125, 0.7500, 0.6875, \\ 0.6250, 0.5625, 0.5000, 0.4375, 0.3750, \\ 0.3125, 0.2500, 0.1875, 0.1250, 0.0625 \end{Bmatrix}$$

All possible values of the U and V can be represented in appropriate fixed point representation with 4 bits of fractional part.

The disclosed modified LK method removes the above-described image warping used in the known LK method. The image warping step is removed by using one pass, assuming that the OF is essentially constant in a local neighborhood and equal to the pixel under consideration. Significantly, this allows reuse of the pixel data fetched during step search process to be used for Gt computation which is especially useful as random accesses to the memory can be avoided. As described above, the modified LK method also splits the compute into sub-tasks of spatial gradient computation and the remaining of the operations.

The revised OF measurements may be filtered using a post processing filter (see post processing filter 306 in FIG. 3 described below) to obtain the final output OF estimates 112 generated by the image processor 102 may be provided to the control system 108. The control system 108 may apply the revised OF measurements 112 to control the motion of the system 100, to present motion information to a user of the system 100, etc. For example, if the system 100 is an automotive driver assist system (ADAS), then the control system 108 may apply the revised OF measurements 112 to determine whether a vehicle should change speed and/or direction based on the relative motion of the vehicle and objects detected by the image processor 102. In some ADAS implementations, the control system 108 may autonomously change vehicle speed and direction based, at least in part, on the revised OF measurements 112, while in other embodiments the control system 108 may, based on the revised OF measurements 112, provide alerts to an operator of the vehicle indicating that changes in speed and/or direction may be advisable. Similarly, in robotics, and other motion control applications, the control system 108, may control movement (speed and/or direction) of an element of the system 100 based on the revised optical flow measurements 112.

Figure 2:
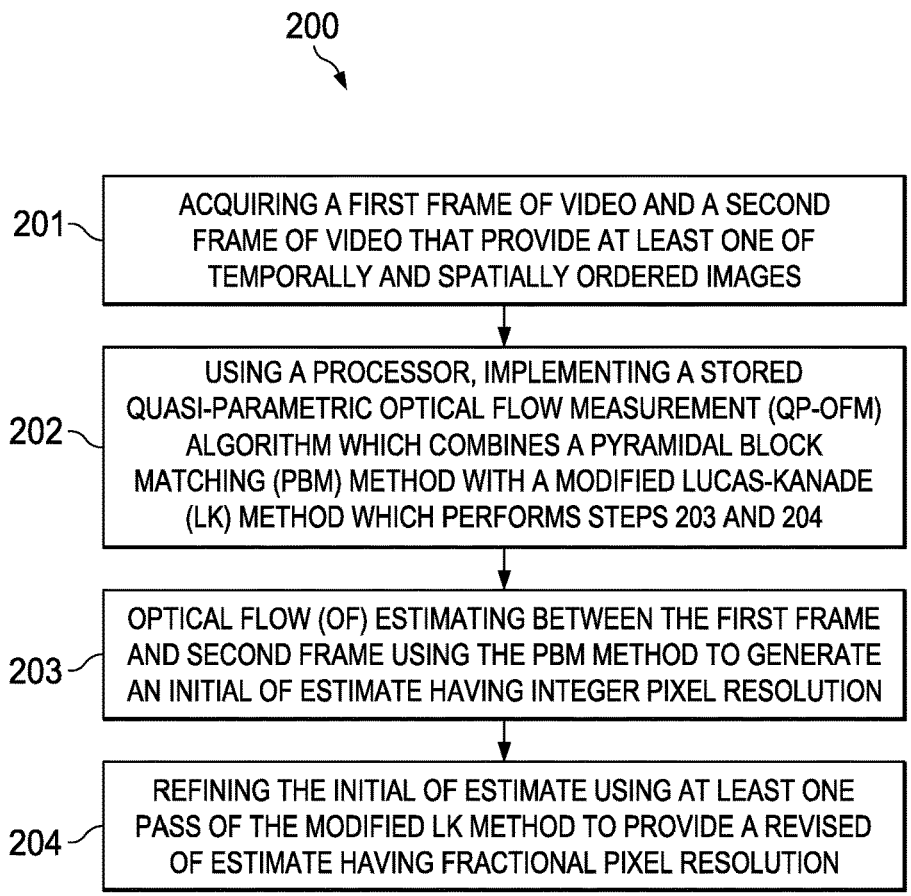
FIG. 2 is a flow chart that shows steps in an example method of optical flow measurement using a disclosed QP-OFM, according to an example embodiment.

FIG. 2 is a flow chart that shows steps in an example method 200 of OF measurement using a disclosed QP-OFM, according to an example embodiment. In this example the modified LK method is applied only at the base level of the pyramid. Step 201 comprises acquiring a first frame of video (e.g., a reference image) and a second frame of video (e.g., a query image) that provide at least one of temporally and spatially ordered images. Optionally, stored historic flow estimates or auxiliary estimates derived from parametric model of the image velocities may also be provided as prior evidence of the image velocities to be used as predictors during PBM process. In typical operation the QP-OFM algorithm estimates motion as instantaneous image velocities (pixel motion) when the inputs given are two temporally ordered images, optionally along with prior/auxiliary flow estimates which provides evidence of the image velocities.

Step 202 comprises using a processor implementing a stored QP-OFM algorithm which performs steps 203 and 204. Step 203 comprises optical flow estimating between the first frame and second frame using the PBM method to generate an initial obtained flow estimate having integer pixel resolution. The PBM method starts the optical flow estimation at the highest pyramid level using spatial predictors and a step search method (described below) based block matching (BM) process that minimizes a cost function value to obtain accurate motion estimation. These optical flow estimates are then filtered (e.g., using a 2D 5×5 median filter), appropriately scaled up and then refined (again using spatial predictors and step search method) further at each lower pyramid levels sequentially until the base pyramid level. No filtering or scaling of the OF estimates post the BM process at the base layer is needed. In one embodiment the suitable cost function is a Hamming distance over the binary feature descriptors.

At the base pyramid level the predictor configuration can be altered to include temporal predictors or auxiliary predictors, but the step search can remain the same. At base pyramid level, once the PBM process completes, a pass of the modified LK step (step 204 described below) is performed to refine the obtained flow estimates to obtain a revised optical flow estimate having fractional pixel resolution enabling the determination of precise pixel motion. According to another embodiment a pass of the modified LK method may also be applied while processing higher pyramid levels after the BM process.

In order to reduce computations and data bandwidth, instead of BM processing each pixel, at each pyramid level the BM process can work on a 2×2 paxel (a 2×2 block of neighboring pixels) granularity where different computational blocks such as the predictor evaluation and step search can work on 4 pixels simultaneously. This method can also be applied for all possible paxel configurations including 1×1 (=a pixel), 3×3, 2×4 etc., although experiments have found a 2×2 paxel to be best for desired quality and HWA efficiency. In such a scheme the predictors are evaluated only for one representative pixel in the paxel to decide the best estimate (winner predictor) of the OF, which is then independently refined for all pixels in the group during the step search process.

The flow post processing involves use of a 2D median filter (see flow post processing filter 306 in FIG. 3 described below), such as having a size 5×5 (height×width). The post processing block takes as input the OF estimates (Fi) and generates the filtered OF output (F). Alternatively a pseudo 1D separable median filter, such as of a size 9×9 can also be used. The 9×9 filter can be separated into 3×9 and 9×3 filters applied sequentially in that order (or can be reversed). The height and width of the filter is configured so that number of flow samples (27) used in median computation is small yet provides high quality post processing. In this case to filter the boundary pixels border extension of flow field on all sides by 4 pixels is performed. The confidence assignment block (see confidence assignment block 307 in FIG. 3 described below) can use the cost function values computed during the PBM step and local variability of the obtained flow estimates in a learning based framework to assign a confidence level for each pixel.

Step 204 comprises refining the initial PBM obtained flow estimate using at least one pass of the modified LK method to provide a revised OF estimate having fractional pixel resolution. As described above the modified LK method modifies the known LK algorithm to remove the conventional image warping step and splits the compute steps into two groups of gradient computation (spatial and temporal) operations and the remaining operations. This LK step thus reuses data fetched by PBM method to perform fractional pixel refinement. The LK step can use reduced precision gradient data for the OF refinement. The LK step can also only use integer arithmetic to perform compute tasks including matrix inversion.

As described above, the method can optionally include post processing filtering (see flow post processing filter 306 in FIG. 3 described below which filters flow vectors output by the QP-OFM algorithm block 304). For example, pseudo-1d separable median filters can be used to remove impulsive noise from the estimated flow vectors.

Figure 3:
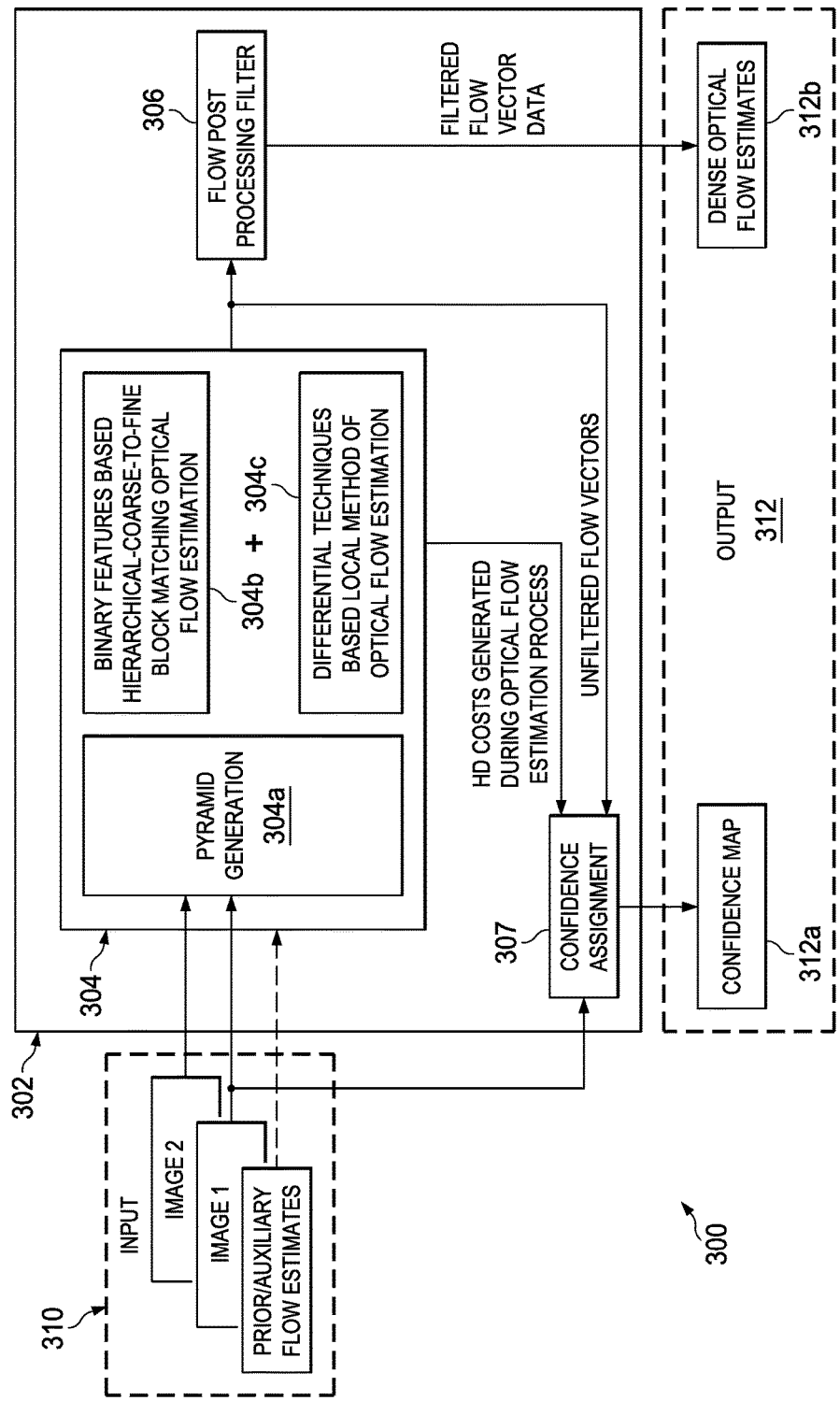
FIG. 3 is a simplified block diagram of an example disclosed QP-OFM arrangement.

An example QP-OFM arrangement 300 is presented as a simplified block diagram shown in FIG. 3 including inputs 310 to an OF calculation block 302 which includes a QP-OFM algorithm block 304, where the OF calculation block 302 provides outputs 312, according to an example embodiment.

The inputs 310 are generally two grayscale images. One can also use any one of the chroma channel information represented as one binary value per pixel. A query image is shown as image 1 and a reference image shown as image 2, between which the OF is to be measured/estimated by the QP-OFM scheme arrangement. Prior/auxiliary optical flow estimates are shown provided as other inputs. Such prior estimates are temporally preceding the current optical flow estimate and are generally provided at the resolution same as that of the input images (image 1 and image 2), and have an expected density of 100% that is estimated for each pixel or paxel.

The Image Pyramid Generation Block (shown as pyramid generation) 304a receives inputs 310 including grayscale images (I) comprising image 2 and image 1, a programmed number of pyramid levels N, and sigma value (Sg) (e.g., from a processor) to be used to derive a Gaussian filter kernel. Image Pyramid Generation Block 304a outputs an image pyramid of N levels multi resolution representation of image such that every $n^{th}$ image in the pyramid is half the resolution in both horizontal and vertical dimensions of the image at $(n-1)^{th}$ level. Image Pyramid Generation Block 304a generally provides preprocessing. If input image has dimensions W×H and the image pyramid will have N levels, the image can be padded on bottom and right, such that resultant image dimensions W'×H' are multiple of $2^{(N-1)}$ or $2^{(N)}$ in some cases. The padded pixels can have value 0. Let the padded image be called I'.

An example process for Image Pyramid Generation Block 304a is described below:

Let $P_i$ represent the image in the $i^{th}$ pyramid level.
Initialization: $P_1$ =I', derive 2D Gaussian filter kernel G of size 5×5
FOR (i = 2; i<=N; i++) % i represents the level in image pyramid
    Filter $P_{(i-1)}$ with the Gaussian filter kernel G to obtain filtered image $P'_{(i-1)}$
    Obtain a scaled down image $P_i$ by choosing alternate pixels of $P'_{(i-1)}$ in both the directions
END Besides pyramid generation block 304a, QP-OFM algorithm block 304 also includes a block matching optical flow estimation block 304b (implementing the block matching, filtration and scaling functionality involved in the PBM process (step 203) and a differential techniques-based local method of optical flow estimation block 304c (for implementing the modified LK (step 204). Blocks 304b and 304c process one pyramid level at a time starting from top of the pyramid. Block 304c is enabled only for base of the pyramid in one embodiment, and at all levels in another embodiment. Block matching optical flow estimation block 304b provides an OF estimate with integer pixel precision. Optical flow estimation block 304c provides a revised OF estimate with fractional pixel resolution. The filtration and scaling functionalities of the Block 304b can be disabled at base of the pyramid for the embodiment where Block 304c is enabled only for base of the pyramid. In the embodiment when Block 304c is enabled at all levels the filtration and scaling functionalities of Block 304b are disabled for base of the pyramid and for the higher levels these functionalities are used after revision (by Block 304c) of the OF estimates (obtained by Block 304b).

As described above, inputs to the pyramid generation block 304a include two grayscale images (query image and reference image) for which optical flow is to be estimated and historic image velocity estimates or temporal predictors (all of dimensions W'×H' pixels). The temporal predictors are an optional input and their multiscale representation is not obtained by the pyramid generation block 304a, it is shown with the dotted path in FIG. 3

QP-OFM algorithm block 304 outputs a flow estimate comprising appropriately filtered and scaled flow vectors for next pyramid level ($F_{i-1}$) or refined flow estimates ($F_i$) if i=1 (i.e. base resolution). The QP-OFM algorithm block 304 output for levels higher than the base level is consumed within QP-OFM algorithm block 304 and at the base level is passed on to the flow post processing block 306 and to the confidence assignment block 307. As disclosed above, for levels other than base level, the flow can be filtered with a simple 2D median filter, with a flow estimate resolution increased to match that of lower level and flow estimates scaled with appropriate scale factor. It may be followed by a rounding operation when a pass of modified LK is applied at all pyramid levels. For base level the QP-OFM algorithm block 304 output is passed on to flow post processing block 306, such for post processing by pseudo-1D separable median filters and to 307 for confidence assignment.

Pre-computation processing can also be provided prior to QP-OFM algorithm padding (toward bottom and right) so that all levels have integer dimensions and exactly the same (e.g., 0.5) scale factor. Initialization can comprise flow estimates ($F_N$) to 0 for level N.

An example process provided by QP-OFM algorithm blocks 304b and 304c for a pyramid level is described below. The process described is for a pyramid level except the binary census transform step, but the algorithm block 304b may also provide the functionality of preparing binary pixel descriptors by binary census transform for the query image and reference image.

FOR (All 2×2 paxels in the query image) % Processed in raster scan order
    Prepare a list of predictors, for the top left pixel in the paxel
    Compute a median of the horizontal and vertical components of the predictors.
        Let the resultant flow vector be called the median predictor.
    Find the best predictor (winner predictor) that minimizes the Cost function value in reference image
    Set winner predictor as the current optical flow estimate for all 4 pixels in the current 2×2 paxel
        FOR (All pixels in the current 2×2 paxel in the query image)
            3-1 Search: perform in plane coarse-to-fine (skip pel-3+skip pel-1) block matching search around the current optical flow estimate minimizing the Cost function value.
                During skip 1 search if LK step is enabled for current level Compute horizontal (Gx) and vertical (Gy) image gradient data for query image along with temporal (Gt) gradient using query image and motion compensated reference image. If these computations are performed during skip pel-1 search, LK step does not require any data fetch from memory for motion compensation.
                Note: Gradients are computed using gray level pixel information and not census transform data.
        The modified LK Step (:if LK step is enabled for current level)
            Using the image gradient data Gx, Gy and Gt to solve for change in the optical flow estimates
            Clamp change within [−1, 1] range in both horizontal and vertical directions
            Update the optical flow estimates obtained during step search process by adding flow values computed in this step.

---

END
END
IF (i ≠ 1) i.e not the base level
    Obtain flow estimates for next pyramid level
    Input: Flow estimates for current level ($F_i$)
    Output: Flow estimate for next pyramid level ($F_{i-1}$)
    Process:
      - Perform 2D median filtering of the updated flow estimates $F_i$
      - Upscale the flow estimate resolution
      - Scale the flow values using appropriate scale factor and round off to nearest integer value
ELSE
    Input: Flow estimates at fractional pixel precision ($F_1$)
    Output: Post processed optical flow (F)
    Process:
      - Perform post filtering of the obtained flow estimates $F_1$ to get output flow F
      Crop F to original image dimensions
END

---

As noted above, OF calculation block 302 is also shown having a flow post processing filter 306 that receives unfiltered flow vector data from QP-OFM algorithm block 304 and outputs filtered flow vector data. OF calculation block 302 is also shown having a confidence assignment block 307. Confidence assignment block 307 receives Hamming distance (HD) costs generated during optical flow estimation processing and unfiltered flow vectors from QP-OFM algorithm block 304, and generates confidence data.

Flow post processing filter 306 is shown outputting filtered flow vector data that has horizontal and vertical flow components which provides a dense OF estimate output 312b. The confidence data assigned is a confidence level for each pixel by confidence assignment block 307 is shown provided to the confidence map 312a. The dense optical flow estimates 312b are generally provided at the resolution same as that of the input images (image 1 and image 2), with an expected density of 100%, a bit resolution per pixel per flow component of 16 bit fixed point (7 and 8 integer bits for vertical and horizontal flow components respectively and 4 fractional bits for both of them).

Computational details and illustrations for various QP-OFM algorithm steps are now described. Regarding Gaussian filtering processing in pyramid generation block 304a, a Gaussian filter of size 5×5 can be used to filter pyramid level images such that immediately upper pyramid level image can be generated by dropping alternate pixels from the filtered image. A Gaussian Kernel derivation is provided below.

In 2-D (x,y), an isotropic Gaussian kernel of size 5×5 has the following form:

$$G(x, y) = \frac{1}{2\pi Sg^2} e^{-\frac{(x-2)^2+(y-2)^2}{Sg^2}}$$

Where Sg is the distance sigma value used to derive Gaussian filter kernel, and (x,y) represents a row and column location of a filter coefficient in the Gaussian kernel. In a 5×5 filter kernel possible row and column positions are in range [0,4]. This scheme uses a Sg value of 1.61. The filter coefficients thus obtained are real numbers in fixed point representation. Regarding the Filtering process (e.g., implemented by a separate FIR filter), at any pyramid level 'n' the Gaussian filtered image $P'_n$, is obtained by convolving the image $P_n$ with a Gaussian mask G as defined in the above section.

$$P'_n = G * P_n$$

During the convolution process the boundary pixels are filtered by performing a border extension of 2 pixels on each side.

Figures 4, 5:
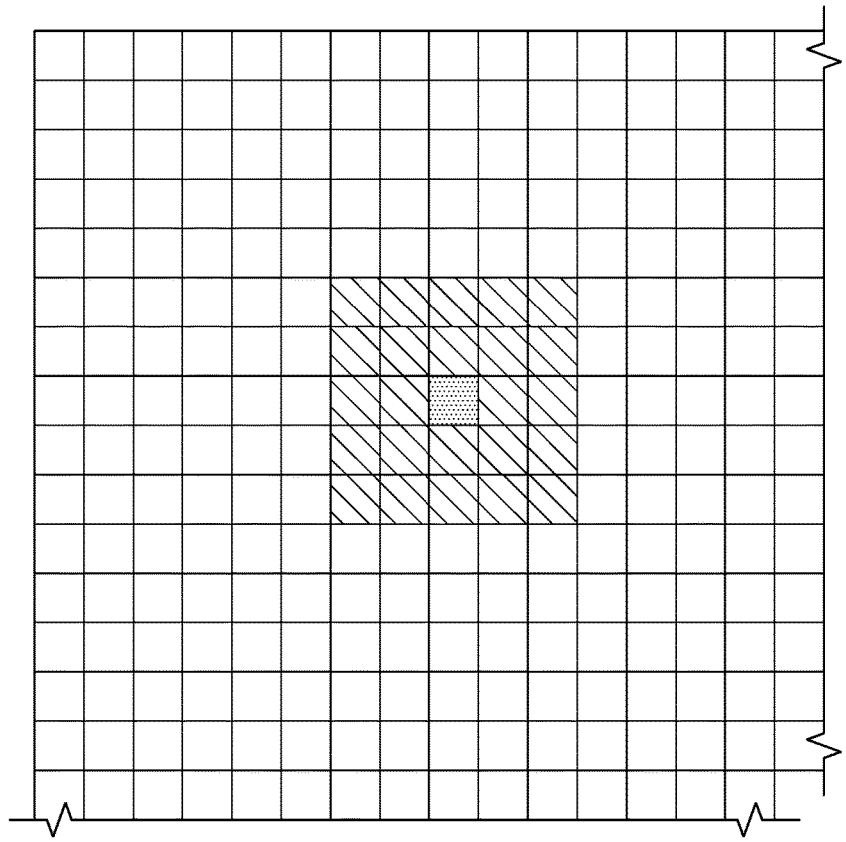
FIG. 4 illustrates a method for computing a 24 bit census descriptor for central pixel x considering its 24 neighbors (a 5×5 neighborhood) and their relationship, according to an example embodiment.
FIG. 5 illustrates 5×5 neighborhood pixels used in census signature computation of a pixel.

The binary features-based coarse-to-fine block matching optical flow estimation block 304b can also perform a binary census transform. A method for computing a 24 bit census descriptor for central pixel x considering its 24 neighbors (a 5×5 neighborhood) and their relationship with it is illustrated in FIG. 4. A bit corresponding to a neighborhood pixel is set to 1 if it has the grayscale value greater than or equal to the pixel x, otherwise the bit is set to 0. FIG. 5 illustrates 5×5 neighborhood pixels used in census signature computation of a pixel. While computing Census transform for the border pixels border extension technique is used to replace missing pixels. The square box in middle of the shaded region is the central pixel for which census transform is being computed.

Figure 6:
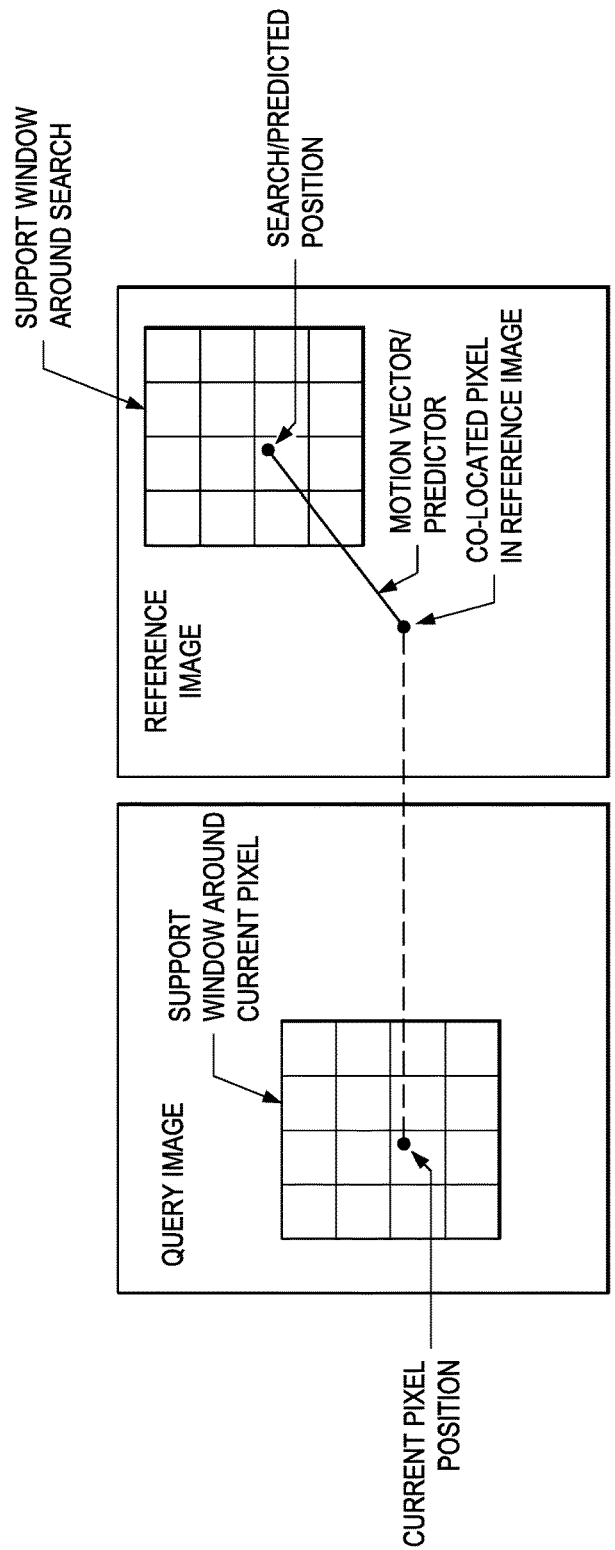
FIG. 6 illustrates an example support window.

Regarding a cost function, as described above, the PBM method uses a binary census transform for pixel description and a Hamming distance as the Cost function during the predictor evaluation and step search. While evaluating cost function value at a predicted/search position, a square neighborhood (support window) of 9×9 around the current pixel (see FIG. 6 described below for an illustration of a support window) in query image and same sized neighborhood around the predicted/search position in the reference image is considered. These neighborhoods act as query data and reference data which are compared bitwise to find discordance. In order to do this, the binary signatures of the 81 pixels in query and reference data are concatenated in to two binary vectors. If Qv and Rv represent these vectors then the binary Hamming distance between them is computed as:

$$HD = \text{bitcount}(Qv \oplus Rv)$$

Where ⊕ defines the bitwise exclusive-or operation between two binary vectors. The bitcount operation calculates the number of bits set to one after the bitwise exclusive-or operation and output HD is the Hamming distance between the two data. Predictor list preparation may also be used. Predictors are the existing OF estimates for spatial, temporal neighbors that can be used as initial OF estimates for the block matching search based OF estimation process for a pixel. The OF estimation algorithm may use 5 different predictors per paxel. These include OF estimates of the 4 neighbors of the top left pixel in the paxel, which are labeled in FIG. 7. These are the pixels that precede the top-left pixel when traversing the image in raster scan order from left to right and top to bottom.

Figure 7:
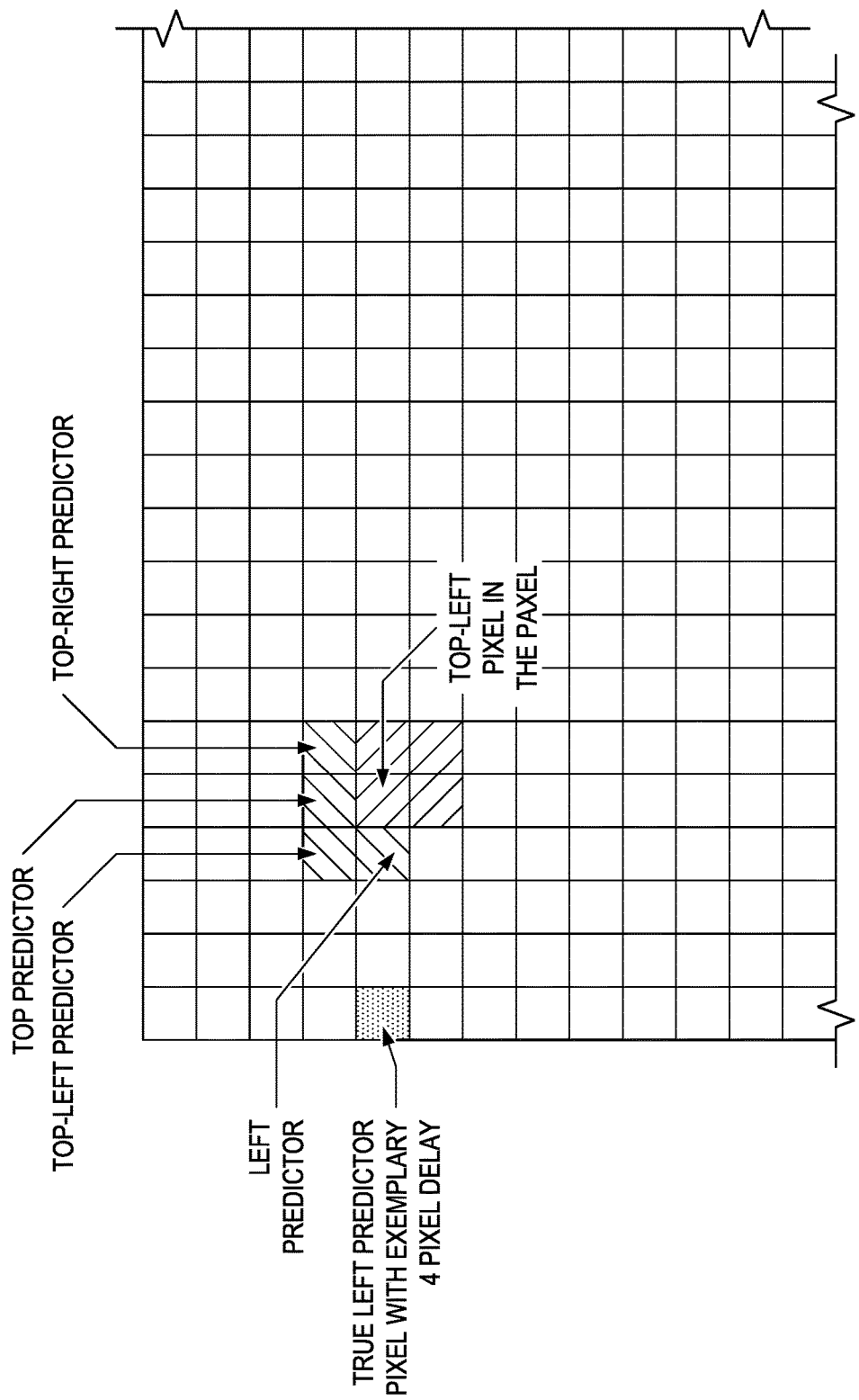
FIG. 7 shows an example predictor list including optical flow estimates of the 4 neighbors of the top left pixel in the paxel.

Accounting for the pipelined design of HWA, the left predictor is expected to come from the left neighbor of the top-left pixel in the paxel where OF estimate for the pixel derived in higher pyramid level and appropriately scaled for current pyramid level is the predictor value. This predictor is called as pyramidal-left predictor. In alternate designs left predictor value may come from a pixel whose OF estimate has been refined in the current pyramid level and lies to the left of the top-left pixel at some pixel distance. This predictor can be called as delayed-left predictor. Fifth predictor is the existing OF estimate for the current pixel, which is derived in higher pyramid level and appropriately scaled for current pyramid level. At the base pyramid level the pyramidal-left/delayed-left is disabled and replaced with temporal predictor when it is enabled. Predictor usage is summarized in the Table 1 below and relative pixel locations (with respect to top-left position in the paxel) providing top and left spatial predictors are depicted in FIG. 7.

TABLE 1

Summary of example predictor usage according to the pyramid level

| Pyramid Level | User configuration | Predictors used |
| --- | --- | --- |
| Base pyramid level | Temporal predictor enabled | Top-right, top, top-left, pyramidal-co-located and temporal predictor |
| | Temporal predictor disabled | Top-right, top, top-left, pyramidal-co-located, pyramidal-left/delayed-left |
| Other than base pyramid level | Not applicable | Top-right, top, top-left, pyramidal-left/delayed-left and pyramidal-co-located predictor |

It is noted temporal predictors can be in fractional-pel resolution, thus it is rounded off to nearest integer location. Other spatial predictor values are obtained during the step-search for refinement of OF estimates for corresponding pixels or from the higher pyramid level estimate. They are commonly of integer pixel resolution but in case of using LK step at each pyramid level they can be in fractional pixel precision and should be rounded off to nearest integer. The top predictors are generally not available for top row of the picture and top-left and left predictors are not available for left border pixels and top-right predictor is not available on right boundaries. In this scenario unavailable predictors should generally be replaced with either pyramidal-co-located predictor or set to (0,0) value. When using pyramidal pyramidal-co-located predictor for this purpose at highest pyramid level it takes the value (0,0).

A computation can be made for the median predictor. The median predictor to be used in the search process is computed by independently finding median of the horizontal and vertical components of the selected predictors.

Regarding selection of the best predictor, considering an example 9×9 support window around the top left pixel in the paxel, the cost function value is estimated at all the predicted positions in the reference image and predictor that leads to minimum Cost function value selected as the winner predictor. In case the Cost function values are same for more than one predicted positions the first predictor in the evaluation order that leads to the minimum value is chosen as the winner predictor. An example evaluation order is 1) pyramidal-current, 2) pyramidal-left/delayed-left/temporal, 3) top-right, 4) top and 5) top-left. The predictor evaluation for the top-right, top, top-left predictors can be merged with step search for corresponding pixel locations in the top row to minimize the data read from memory.

Figure 8:
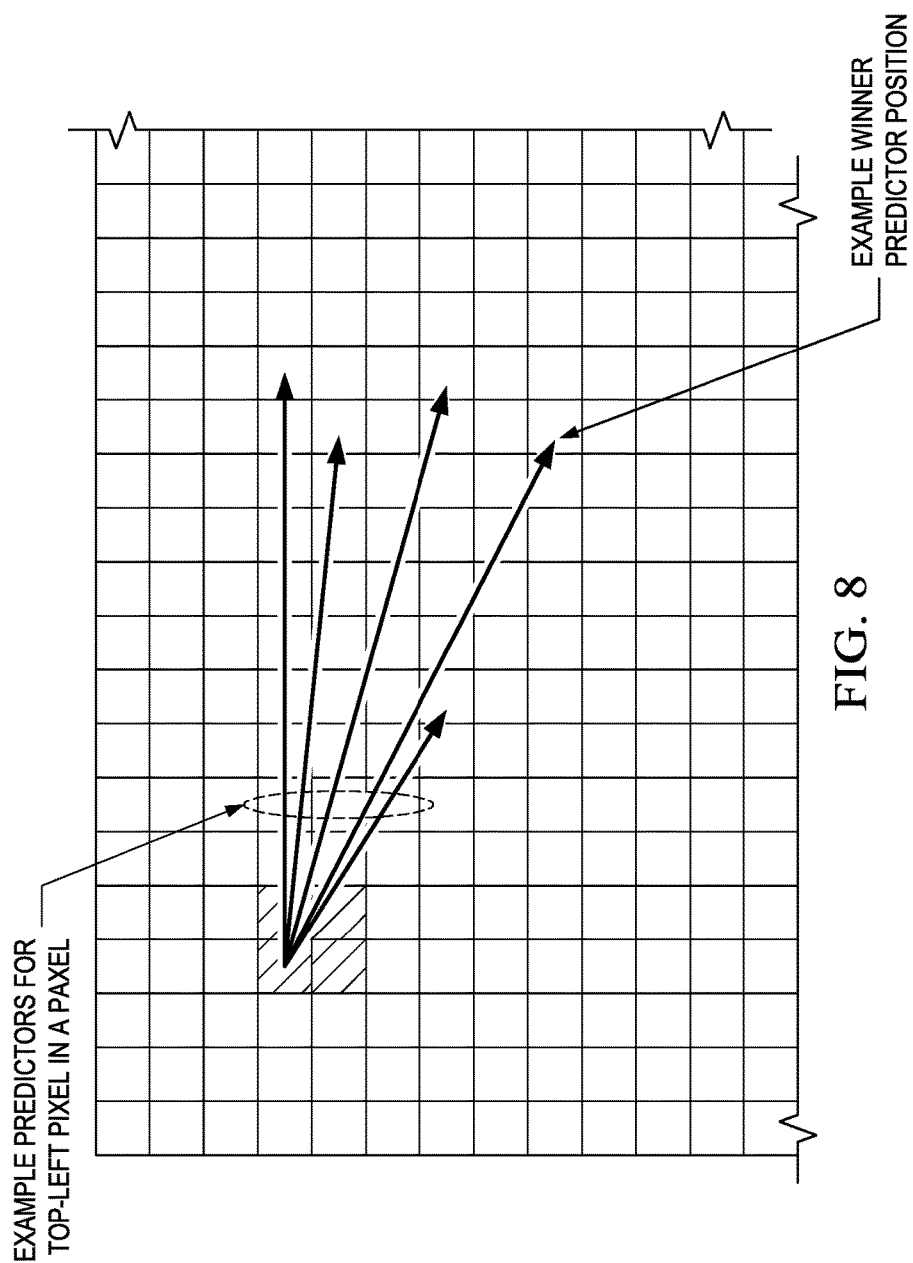
FIG. 8 provides an illustration of predictor evaluation involving 5 candidate predictors for current paxel and the winner predictor among them.

FIG. 8 provides an illustration of predictor evaluation involving 5 candidate predictors for current paxel and the winner predictor among them. The winner predictor now is set as current OF estimate for all pixels in the paxel and further refined by step search process explained below.

During the step search process in-plane coarse-to-fine search can be performed to refine the current OF estimates such that Cost function value is minimized. The cost function used during step search is defined as HD+MVCost. Where MVcost is defined as product of the motion smoothness factor ($\lambda=24$ as a sample value) and vector distance (city block or sum of absolute differences of horizontal and vertical components) between the search point and the median predictor. The search is performed in a specific pattern such that computational complexity is minimized while providing wider refinement range.

Stage-1 (Skip-3)

In this stage the skip-3 search over 9 locations (3×3 grid) locations centered on the winner predictor is performed. The search points are at 3 pixel distance from the current optical flow estimate or winner predictor position. In FIG. 8 which illustrates the 3-1 step search process and the coarse-to-fine search paths, these 9 locations are depicted by the dotted pattern pixels for top left pixel in the paxel. The nine candidate positions are evaluated in raster scan order, starting from the top left position in the grid. In case the Cost function values are same for more than one search positions the first search position in the evaluation order that leads to the minimum value is chosen as the position and OF is estimated accordingly.

Stage-2 (Skip-1)

In this stage the OF estimate obtained in previous stage is refined by searching over 9 points in a 3×3 neighborhood (Skip-1) marked by random fill pattern. The winner of Stage-2 gives best integer pixel motion estimate around the winner predictor. In case the Cost function values are same for more than one search positions the first search position in the evaluation order (raster scan) that leads to the minimum value being chosen as the winner position and the OF estimate is updated accordingly.

Regarding the search range restriction, at any pyramid level when the candidate position (during predictor evaluation or step search) at which the Cost function value is to be evaluated is at distance larger than a threshold value called search range in horizontal (191 pixels) or vertical (63 pixels) directions, then corresponding search position can be ignored. If all candidate positions during predictor search step are at distance larger than the search range, then current optical flow estimate can be set to (0,0). This can be achieved by setting a pyramidal co-located predictor value to (0,0).

Figure 9:
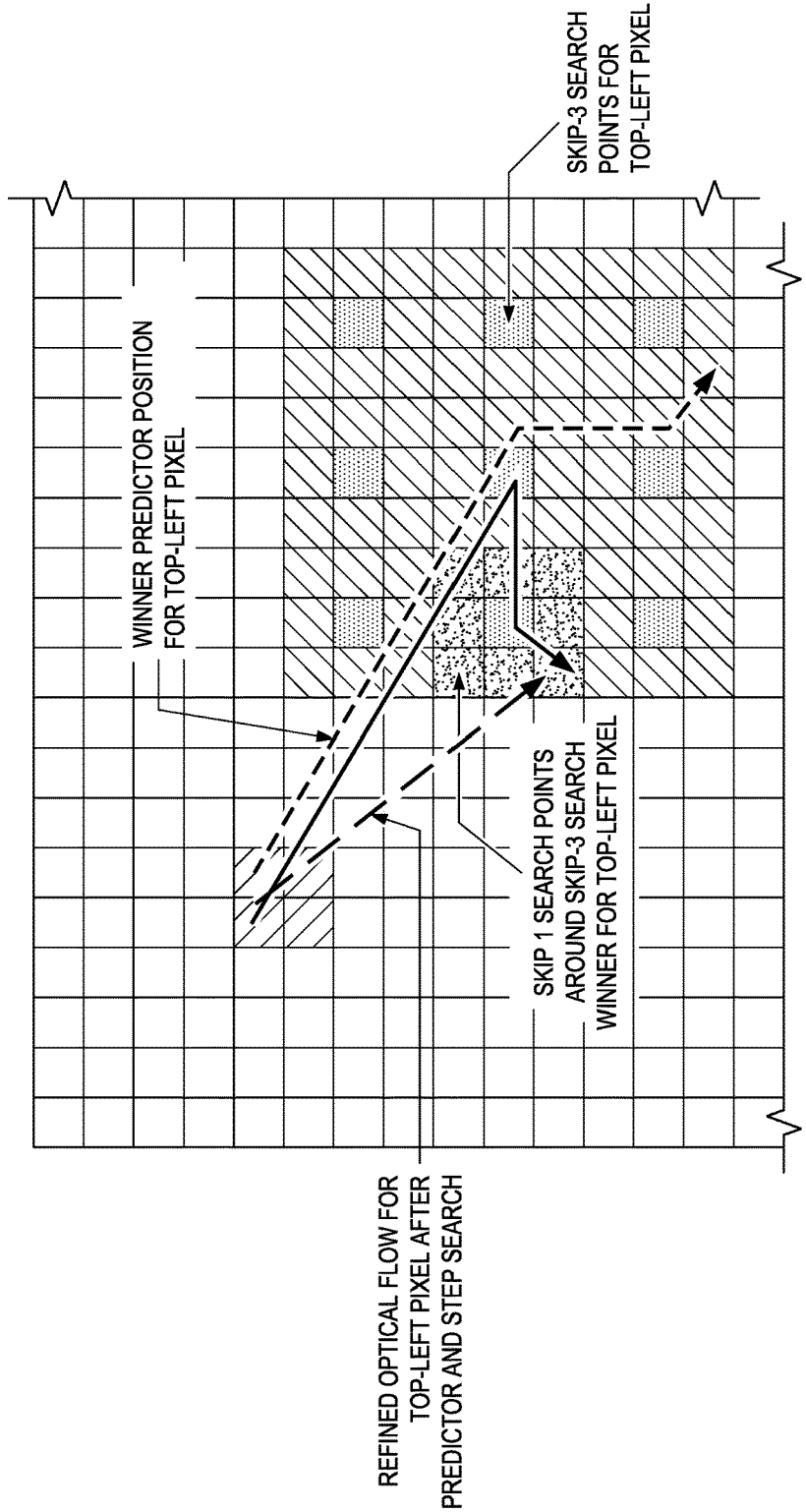
FIG. 9 shows a coarse-to-fine search pattern around the winner predictor.

The coarse-to-fine search pattern around the winner predictor is illustrated in FIG. 9. FIG. 9 illustrates example search paths for 3-1 search for two top pixels in the paxel, the refined OF for one top-left pixel in the paxel, along with the refinement range provided by step search block (different patterned pixels depict the possible outcomes from step search refinement for the top-left pixel) FIG. 9 also illustrates that OF estimates for the two pixels at beginning of the step search process can be same but during step search process their OF estimates can diverge.

Regarding pre-evaluation of the predictors for the lower row of paxels, at any pixel during step search process, for the paxels to which the pixel provides one of the top predictor values, the predicted position (OF for the pixel after the Skip-1 search) is evaluated using already fetched data and cost is stored for later use. As a result, repeated data read during the predictor selection step is not necessary.

Regarding computation of spatial and temporal gradients used in LK step when the LK step is enabled for a level, these computations are performed for all pixels during step search process to avoid a repeated data read by the LK step block. In this modified LK step, spatial and temporal image gradients are computed (using grayscale pixel values) for all pixels locations in the 3×3 neighborhood of the current pixel in the query image.

Computation of Spatial Gradients

The horizontal spatial gradient (Gx) and vertical spatial gradient (Gy) are computed using central difference operator (mask=[−1 0 1]) thus needing pixels within 5×5 neighborhood of the current pixel. At image boundaries a border extension (2 or 1 pixels as necessary) is used to compute the spatial gradients.

Computation of Temporal Gradients

The temporal image gradient (Gt) all pixels in the 3×3 neighborhood is computed considering neighborhood of current pixel in query image and same sized neighborhood of the location to which it is estimated to have moved in the reference image (this is the winner position obtained during skip one search). Pixel-wise Gt computation is performed by subtracting the reference image pixel value from corresponding pixel value in query image. At image boundaries border extension (1 pixels) is used to compute gradients.

Gradient Precision

For 12 bit input images the spatial and temporal gradient values are of 13 bit precision. This precision is reduced to 10 bits by performing 2 bit right shift and clamping post shift values between −512 and 511.

The PBM method described above estimates pixel level OF at integer pixel resolution and this estimate is generally close to the actual pixel motions. However, it is refined further to more accurately match the later. As described above, to refine the PBM generated initial OF estimates to provide fractional pixel accuracy ("revised OF estimate"), the QP-OFM algorithm uses at least one pass of a modified LK method.

Regarding 2D median filtering of the flow estimates, after updating all the flow estimates at a pyramid level other than base pyramid level they can be filtered using a 2D median filter of size 5×5. At image boundaries border extension (2 pixels) is generally used to compute median values. Regarding flow resampling, post 2D median filtering, for all pyramid levels other than base level, the flow estimates for next lower pyramid level are obtained by up-scaling the flow estimate resolution using nearest neighbor interpolation and scaling the flow vectors by the resolution upscale factor (2).

Regarding flow post-processing, if enabled by a user through configuration, the flow post processing in the QP-OFM algorithm involves use of 2D median filter, such as of size 5×5. The post processing block 306 takes as an input the optical flow estimates (Fi) from QP-OFM algorithm block 304 and generates the filtered optical flow output (F) shown as filtered flow vector data. For filtering the boundary pixels border extension of flow field on all sides by 2 pixels is performed. Alternatively a pseudo 1D separable median filter of size 9×9 (height×width) can also be used. The 9×9 filter is separated into 3×9 and 9×3 filters applied sequentially in that or reverse order. The height and width of the separated filters is configured so that number of flow samples used in median computation is small yet provides high quality post processing. In this case to filter the boundary pixels border extension of flow field on all sides by 4 pixels is performed.

Due to relatively low computational requirements compared to some conventional approaches such as LK and Horn Schunck (HnS), it is possible to achieve higher resolution and frame rates in real time than previously possible.

Some other specific differences disclosed QP-OFM algorithms over other solutions, such as Hierarchical Model-Based Motion Estimation approach disclosed by Bergen, Anandan, Hanna, and Hingorani, include:

The form of coarse-to-fine search using predictors and motion smoothness factors;

Use of (optional) historic image velocity estimates to improve optical flow estimation accuracy;

Reduction of the predictor evaluation requirements per pixel by opting for paxel (2×2 block of pixels) order of processing and using same set of predictors for entire paxel;

Reduction of the random memory accesses for predictor evaluation by pre-evaluation of the top-right, top and top-left predictors during step search refinement for those pixels;

Removal of interpolation from the algorithm entirely by using combining block matching method with LK step to estimate the fractional pixel motion and achieving large saving in computational requirements;

Pre-computation of the spatial gradient and temporal gradients during block matching process;

Use of pseudo-1d separable filters, and

Ability to balance the computational and optical flow accuracy requirements by changing number of predictors and search resolution.

Advantages of disclosed QP-OFM algorithms include:

Using only computationally simple optimization function 'Hamming distance' between binary feature descriptors over a support window to perform the search.

Saving precious resources by using common set of predictors for a group of pixels to minimize random access to the memory and a pattern of non-exhaustive coarse-to-fine search strategy for optical flow estimation to minimize the computations.

Pre-evaluation of the top predictors saves the memory to computational block data bandwidth (fetching reference pixel data for cost function evaluation) and thus minimizes the design complexity Pre-computation of the spatial gradient and temporal gradients used in modified LK step further saves the memory block data bandwidth (e.g. fetching reference pixel data for temporal gradient computation) and thus minimizes the design complexity As part of the design complexity reduction and DDR bandwidth reduction (described below) two levels of local memories can be used with L2 to store the current and reference picture data in growing window fashion and L1 to store sliding window of the reference picture data to store pixels needed to enable block matching search and LK step over the desired range.

By combining the parametric (PBM) and nonparametric (LK) approaches to define a new algorithm a large number of interpolation operations needed for fractional pixel motion estimation is removed, which is a significant advantage over existing algorithms.

Even the operations involved in the LK step involve integer arithmetic and hence require only constant number of multiplication and addition/subtraction operations to enable computation of highly precise fraction pixel motion estimation.

Disclosed QP-OFM algorithms can be implemented as System-on-Chip (SoC) solutions that provide higher programmable compute power, by offloading low level, compute intensive and repetitive CV tasks to a HWA. The OF techniques which form the basic building block of the camera-based ADAS processes large amounts of pixel data for every frame to generate high levels of information is recognized to be a good candidate for a HWA design.

Figure 10A:
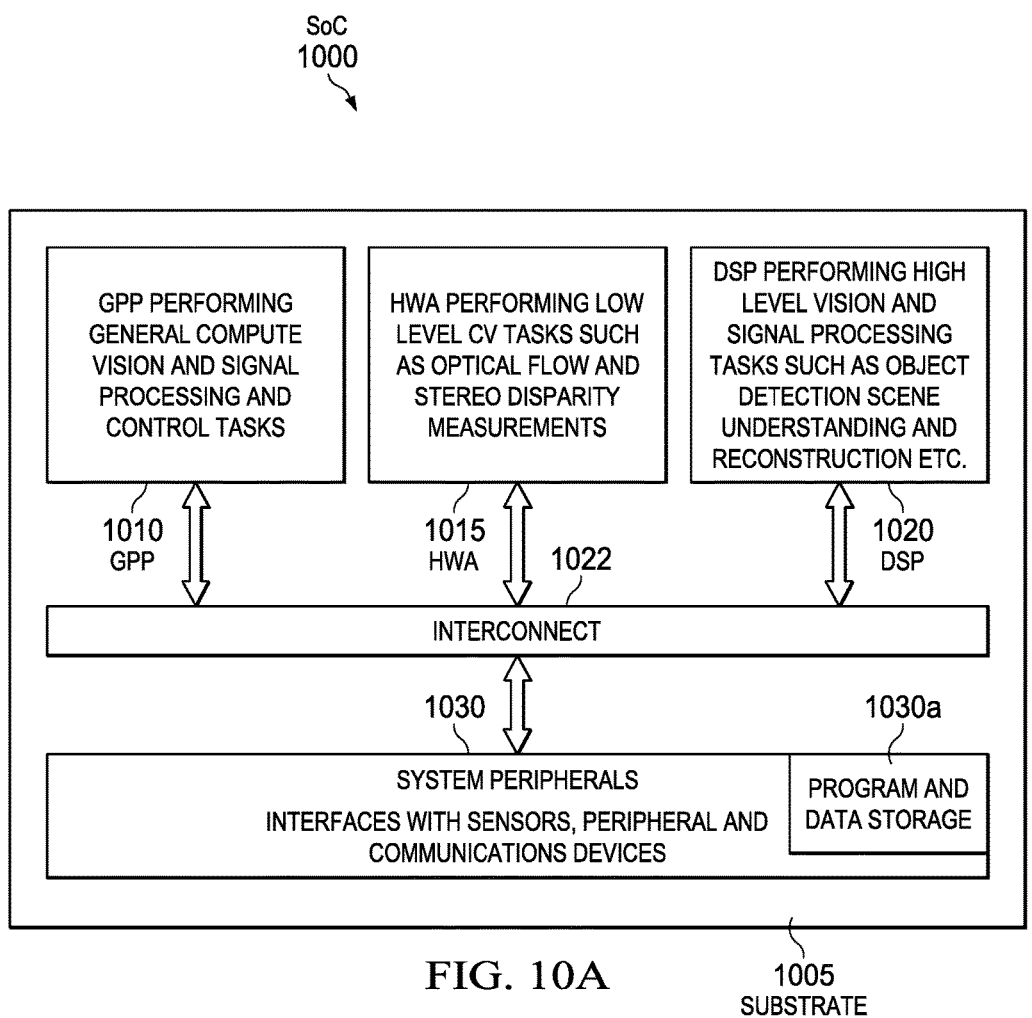
FIG. 10A depicts an example SoC that provides high programmable compute power by offloading low level, computationally intensive and repetitive CV tasks to a hardware accelerator (HWA).

FIG. 10A depicts an example SoC 1000 formed on a substrate 1005 (chip) having a semiconductor surface (e.g., silicon substrate) that provides high programmable compute power by offloading low level, compute intensive and repetitive CV tasks to a HWA 1015. SoC 1000 includes a general-purpose processor (GPP) 1010 that performs general computer vision and signal processing and control tasks. HWA 1015 performs low level CV tasks such as OF and stereo disparity measurements. Another processor shown as DSP 1020 performs high level vision and signal processing tasks such as object detection, scene understanding and reconstruction, and a systems peripherals block 1030 includes program and data storage 1030a. System peripherals 1030 interface with sensors, peripheral and communication devices. An interconnect shown as 1022 on the substrate 105 (e.g., one or more interconnect metal levels) couples the GPP 1010, HWA 1015, and DSP 1020 to the systems peripherals block 1030 on the substrate 1005.

Figure 10B:
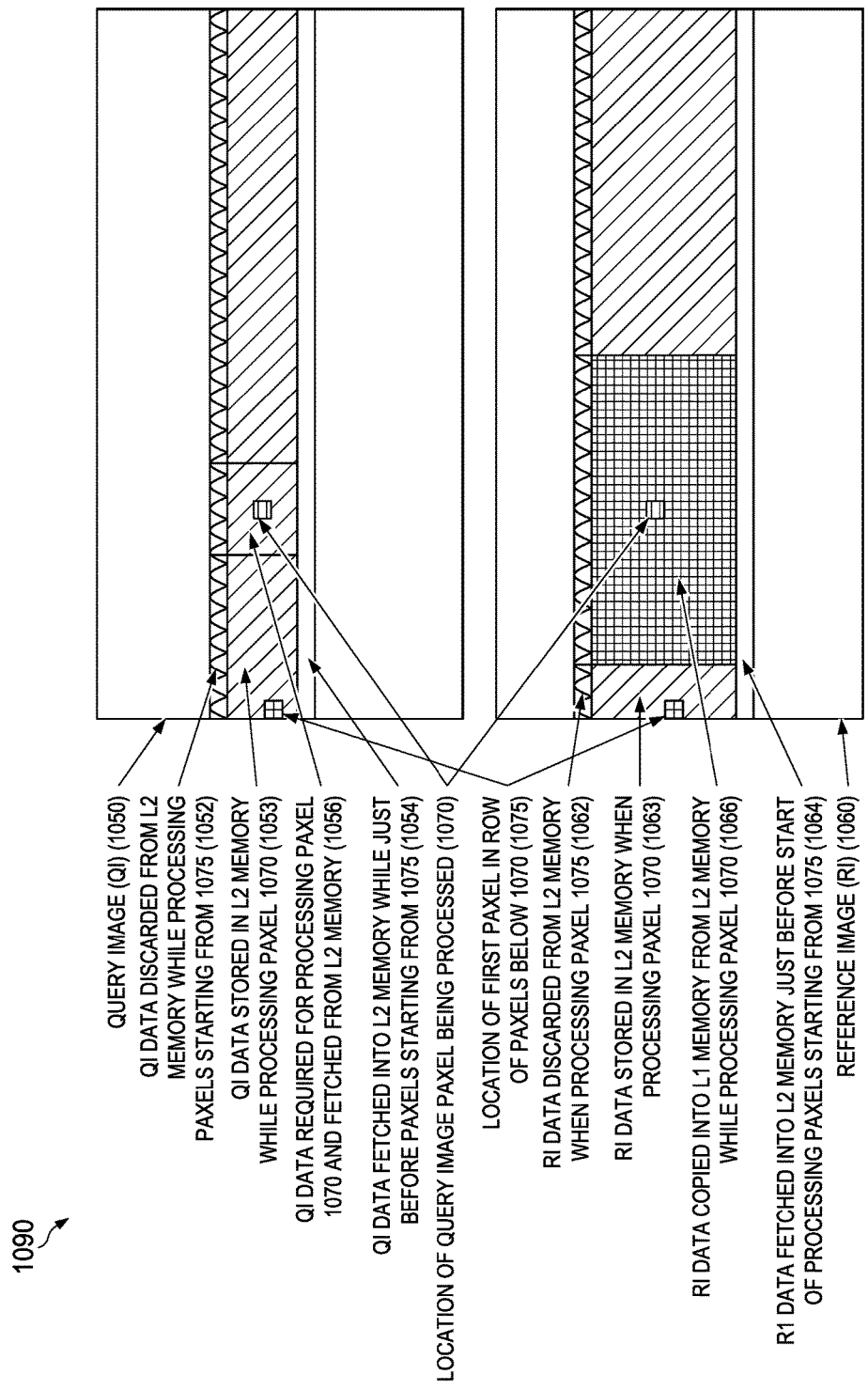
FIG. 10B depicts implementation details of an example scheme of storing and handling the reference and current picture data in the local memories within a HWA or on a programmable processor involving utilizing a combination of two levels of local memory with one memory for storing picture data from the first frame of video and from the second frame in a growing window fashion, and another memory to store a sliding window of the picture data from the second frame of video.

FIG. 10B depicts implementation details of an example scheme 1090 of storing the reference and current picture data in local memories shown as level 1 local memory (L1) and level 2 local memory (L2) within a HWA (such as the HWA 1015 shown in FIG. 10A). This implementation is targeted to minimize the movement of data from the memory (e.g., Random-Access Memory (RAM)) to the HWA implementing the OF logic. In this scheme 1090 both query and reference picture data used to allow proper functioning of the OF estimation process for all paxels in the query image 1050 is fetched and stored in such a way that it is fetched only once from the memory (e.g., RAM). If the query image 1050 and reference image 1060 are the pyramid level images between which the OF is being estimated and the HWA is performing computational tasks involved in computing the OF for a paxel 1070, then FIG. 10B illustrates the extent of image pixel data that needs to be in the local memory. In FIG. 10B the query image is abbreviated QI and the reference image is abbreviated RI.

Considering an embodiment that uses a paxel size of 2×2, block matching support window of 9×9 and the neighborhood size used to compute the census signature of 5×5, then the query image data of size that needs to be available for optical flow computation is a 14×14 neighborhood 1056 around the paxel location 1070. Similarly while evaluating each one of the predictor or step search positions pixel data from a 13×13 neighborhood around those positions is needed. Additionally considering the search range of ±191 pixels in horizontal direction and ±63 pixels in vertical direction a region of rectangular region of 396×140 pixels in pixel block 1066 around the paxel location 1070 is needed to evaluate all possible 'valid' predicted and step search positions along with modified LK computations as necessary. It is noted that when entirety of the pixel block 1066 is not within the picture boundary then appropriate logic of search range restriction (position being evaluate has to be within search range and picture boundary). When the pixel block 1056 and 13×13 neighborhood around the search positions are not contained within the picture boundary appropriate border extension logic is applied.

As order of processing of the paxels is in raster scan (i.e. left to right and top to bottom), effectively the pixel blocks 1056 and 1066 slide over the image in same pattern. Considering the requirement and randomness of the data accesses in these regions it is advantageous to keep this data in the local memory inside of the HWA. But if only the sliding block of pixels is stored in the local memory then, while processing the paxel data such as at the paxel location 1075, the entire block similar to pixel block 1056 or 1066 around that location needs to be fetched from the memory (e.g., RAM), the result is repeated reading of a large number of pixels massively increasing the bandwidth requirement, and the compute resources may also have to stay idle while local memory is populated with required data.

It is possible to overcome these limitations and reduce the bandwidth requirement to fetching a pixel data only once and reusing it across neighboring paxels and paxel rows. In this regard the query image data for entire 14 pixel rows 1053 which are needed to process all paxels in paxel location 1070 can be fetched in to a partition of on chip local memory and the HWA can access required set of 14×14 pixel data from there. When processing for paxel location 1075 is to begin the pixel data 1052 can be discarded, the remainder of the pixel data from memory block 1053 can be stored (retained) and additional pixel data 1054 fetched into local memory. Similarly, the 140 reference image pixel rows on physical memory block 1063 can be stored in another partition of the on chip local memory while processing paxels in the paxel location 1070, and the sliding block of pixels 1066 fetched from there into another memory that is still closer to the HWA to allow faster access to the data.

Again, similar to the memory management done for query image data, when processing for paxel location 1075 is to begin the reference image data 1062 (can be discarded, and the remainder of the data from physical memory block 1063 can be retained and additional pixel data 1064 fetched into local memory for processing of rest of the paxels in that row. The manner of storing entire rows of pixel data in physical memory blocks like 1053 and 1063 in the local memory can be referred to as growing window and storing of sliding block of pixels like 1066 as sliding window. In one implementation the local memory used to store the growing window of pixel data like 1053, 1063 and the sliding block of pixels like 1066 can be the logical partitions of a physical memory blocks, in another implementation they can be stored in more than one physical memory blocks, such as pixel data from memory blocks 1053 and 1063 can be stored in L2 memory and data corresponding to the sliding block of pixels 1066 can be stored in L1 memory. In another embodiment similar multilevel local memory architecture and picture data management scheme can be used when a processor is used to implement the OF logic.

Applications for disclosed OF estimation include solving ADAS tasks such as moving object segmentation, object tracking, time-to-contact (collision) estimation, depth estimation and scene understanding. Disclosed OF estimation enables improved performance ADAS applications such as obstacle detection and collision avoidance auto-emergency braking as compared to known DOF estimation algorithms.

EXAMPLES

Disclosed embodiments are further illustrated by the following specific Examples, which should not be construed as limiting the scope or content of this Disclosure in any way.

In comparison to a fully PBM-based DOF algorithm, an example disclosed QP-OFM algorithm evaluates only about 24 search positions per pixel, uses no interpolations and calculates approximately only 1.33 census transforms per pixel. This represents a large computing saving when processing 60 Million pixels per second which is achieved by adding a fraction of the computing of the OF estimate using a modified LK block. The QP-OFM algorithm further simplifies the HWA design by splitting of compute operations of a functional block into logical subsets and combining subset of operations of different sub-blocks into a set such that they can reuse the pixel data fetched for operations. One example of this type of design is pre-evaluation of the top predictors of a paxel during step search operation of the top paxels. Another example is of pre-computation of spatial and temporal gradients used by LK step during step search process. Such re-packaging of the compute tasks of different functional blocks has led to almost 6 fold reduction of SL2 memory complexity compared to the algorithm disclosed in Pub. Pat. App. No. 2015/0365696 for disclosed QP-OFM algorithms.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. An image processing system, comprising:
a processor, and
optical flow (OF) determination logic for quantifying relative motion of a feature present in a first frame of video and a second frame of video that provide at least one of temporally and spatially ordered images with respect to the first and second frames of video, said OF determination logic configuring the processor to implement:
performing OF estimation between the first frame and the second frame using a pyramidal block matching (PBM) method to generate an initial optical flow (OF) estimate at a base pyramid level having integer pixel resolution, and
refining the initial OF estimate using at least one pass of a modified Lucas-Kanade (LK) method to provide a revised OF estimate having fractional pixel resolution.

2. The system of claim 1, wherein the PBM method utilizes a hierarchical coarse-to-fine search strategy using predictors and motion smoothness factors, a Binary Census Transform for pixel description, and a Hamming distance as a cost function.

3. The system of claim 1, wherein the PBM method utilizes a pixel order of processing using a same set of predictors for each entire pixel and a pre-evaluation strategy for the set of predictors.

4. The system of claim 1, wherein the PBM method uses pre-computation of a spatial gradient and temporal gradient during block matching steps of the PBM method.

5. An image processing system, comprising:
a processor, and
optical flow (OF) determination logic implemented in part by a hardware accelerator (HWA), the HWA utilizing a combination of two levels of local memory with one memory for storing picture data from a first frame of video and from a second frame in a growing window fashion, and another memory to store a sliding window of said picture data from the second frame of video, said OF determination logic is for quantifying relative motion of a feature present in a first frame of video and a second frame of video that provide at least one of temporally and spatially ordered images with respect to the first and second frames of video, the OF determination logic configuring the processor to implement:
performing OF estimation between the first frame and the second frame using a pyramidal block matching (PBM) method to generate an initial optical flow (OF) estimate at a base pyramid level having integer pixel resolution, and refining the initial OF estimate using at least one pass of a modified Lucas-Kanade (LK) method to provide a revised OF estimate having fractional pixel resolution.

6. An image processing system, comprising:

a processor, and optical flow (OF) determination logic for quantifying relative motion of a feature present in a first frame of video and a second frame of video that provide at least one of temporally and spatially order images with respect to the first and second frames of video, said OF determination logic configuring the processor to implement;

performing OF estimation between the first frame and the second frame using a pyramidal block matching (PBM) method to generate an initial optical flow (OF) estimate at a base pyramid level having integer pixel resolution, and refining the initial OF estimate using at least one pass of a modified Lucas-Kanade (LK) method to provide a revised OF estimate having fractional pixel resolution, wherein the modified LK method is exclusive of an image warping step and splits computing the revised OF estimate into sub-tasks of spatial and temporal gradient computation and the other operations, uses reduced precision gradient data for OF refinement, and uses only integer arithmetic to perform compute tasks including matrix inversion.

7. An image processing system, comprising:

a processor, and optical flow (OF) determination logic for quantifying relative motion of a feature present in a first frame of video and a second frame of video that provide at least one of temporally and spatially ordered images with respect to the first and a second frames of video, said OF determination logic configuring the processor to implement;

performing OF estimation between the first frame and the second frame uses a pyramidal block matching (PBM) method to generate an initial optical flow (OF) estimate at a base pyramid level having integer pixel resolution, and refining the initial OF estimate using at least one pass of a modified Lucas-Kanade (LK) method to provide a revised OF estimate having fractional pixel resolution, wherein the PBM method utilizes a hierarchical coarse-to-fine search strategy using predictors and motion smoothness factors, a Binary Census Transform for pixel description, and a Hamming distance as a cost function, and wherein the OF determination logic configures the processor to include in said cost function for each sequential search of the search strategy a motion vector cost value that combines a motion smoothness factor and distance between a median predictor value and a candidate pixel.

8. The system of claim 1, wherein the at least one pass consists of a single pass which applies the modified LK method at all pyramid levels of a search pyramid used by the PBM method including the base pyramid level after the PBM method concludes.

9. The system of claim 1, further comprising a post process filter for post processing filtering using pseudo-1d separable median filters to remove impulsive noise from the revised OF estimate.

10. A method of optical flow (OF) estimation, comprising:

acquiring a first frame of video and a second frame of video that provide at least one of temporally and spatially ordered images;

using a processor implementing a stored quasi-parametric optical flow measurement (QP-OFM) algorithm which combines a pyramidal block matching (PBM) method with a modified Lucas-Kanade (LK) method, the QP-OFM algorithm performing;

optical flow (OF) estimating between the first frame and the second frame using the PBM method to generate an initial OF estimate at a base pyramid level having integer pixel resolution, and refining the initial OF estimate using at least one pass of the modified LK method to provide a revised OF estimate having fractional pixel resolution.

11. The method of claim 10, wherein the PBM method utilizes a hierarchical coarse-to-fine search strategy using predictors and motion smoothness factors, a Binary Census Transform for pixel description, and a Hamming distance as a cost function.

12. The method of claim 10, wherein said PBM method utilizes a paxel order of processing using a same set of predictors for each entire paxel and a pre-evaluation strategy for the set of predictors.

13. The method of claim 10, wherein the PBM method uses pre-computation of a spatial gradient and temporal gradient during block matching steps of the PBM method.

14. A method of optical flow (OF) estimation, comprising:

acquiring a first frame of video and a second frame of video that provide at least one of temporally and spatially ordered images;

using a processor implementing a stored quasi-parametric optical flow measurement (QP-OFM) algorithm which combines a pyramidal block matching (PBM) method with a modified Lucas-Kanade (LK) method, QP-OFM algorithm performing;

optical flow (OF) estimating between the frame and the second frame using the PBM method to generate an initial OF estimate at a base pyramid level having integer pixel resolution, and refining the initial OF estimate using at least one pass of the modified LK method to provide a revised OF estimate having fractional pixel resolution, wherein the modified LK method is exclusive of an image warping step and splits computing the revised OF estimate into sub tasks of spatial gradient computation and then other operations, uses reduced precision gradient data for OF refinement, and uses only integer arithmetic to perform compute tasks including matrix inversion.

15. A method of optical flow (OF) estimation, comprising:

acquiring a first frame of video and a second frame of video that provide at least one of temporally and spatially ordered images;

using a processor implementing a stored quasi-parametric optical flow measurement (OP-OFM) algorithm which combines a pyramidal block matching (PBM) method with a modified Lucas-Kanade (LK) method wherein the QP-OFM algorithm is implemented at least in part as a System-on-a-chip (SOC) including a hardware accelerator (HWA), said HWA utilizing a combination of two levels of local memory with one memory for storing picture data from the first frame of video and from the second frame in a growing window fashion, and another memory to store a sliding window of said picture data from the second frame of video, the QP-OFM algorithm performing:

optical flow (OF) estimating between the first frame and the second frame using the PBM method to generate an initial OF estimate at a base pyramid level having integer pixel resolution, and refining the initial OF estimate using at least one pass of the modified LK method to provide a revised OF estimate having fractional pixel resolution.

16. The method of claim 10, wherein the method is implemented by an image processing system comprising a processor configured for generating a scene analysis.

17. A method of optical flow (OF) estimation, comprising:

acquiring a first frame of video and a second frame of video that provide at least one of temporally and spatially ordered images;

using a processor implementing a stored quasi-parametric optical flow measurement (QP-OFM) algorithm which combines a pyramidal block matching (PBM) method with a modified Lucas-Kanade (LK)method, the QP-OFM algorithm performing;

optical flow (OF) estimating between the first frame and the second frame using the PBM method to generate an initial OF estimate at a base pyramid level having integer pixel resolution, and refining the initial OF estimate using at least one pass of the modified LK method to provide a revised OF estimate having fractional Pixel resolution;

wherein the method is implemented by an image processing system comprising a processor configured for generating a scene analysis; and wherein the scene analysis is used by an Advanced Driver Assistance System (ADAS) for obstacle detection or collision avoidance auto-emergency braking.

18. A method of optical flow (OF) estimation, comprising:

acquiring a first frame of video and a second frame of that provide at least one of temporally and spatially ordered images;

using a processor implementing a stored quasi-parametric optical flow measurement (QP-OFM) algorithm which combines a pyramidal block matching (PBM) method with a modified Lucas-Kanade method, the QP-OFM algorithm performing;

optical flow (OF) estimating between the first frame and the second frame using the PBM method to generate an initial OF estimate at a base pyramid level having integer pixel resolution, and refining the initial OF estimate using at least one pass of the modified LK method to provide a revised OF estimate having fractional pixel resolution;

wherein the PBM method utilizes hierarchical coarse-to-fine search strategy using predictors and motion smoothness factors, Binary Census Transform for pixel description, and a Hamming distance as a function; and wherein the method includes in the cost function for each sequential search of the search strategy a motion vector cost value that combines a motion smoothness factor and distance between a median predictor value and a candidate pixel.

19. The method of claim 10, further comprising post processing filtering using pseudo-1d separable median filters to remove impulsive noise from the revised OF estimate.

20. The method of claim 10, wherein the at least one pass consists of a single pass which applies the modified LK method at all pyramid levels of a search pyramid used by the PBM method including the base pyramid level after the PBM method concludes.

21. The system of claim 1, wherein the first frame of video is a reference image and the second frame of video is a query image.

22. The method of claim 10, wherein the first frame of video is a reference image and the second frame of video is a query image.

23. An image processing system, comprising:

a processor, and optical flow (OF) determination logic for quantifying relative motion of a feature present in a first frame of video and a second frame of video that provide at least one of temporally and spatially ordered images with respect to the first and second frames of video, said OF determination logic configuring the processor to implement;

performing OF estimation between the first frame and the second frame using a pyramidal block matching (PBM) method to generate an initial optical flow (OF) estimate at a base pyramid level having integer pixel resolution, and refining the initial OF estimate using only one pass of a modified Lucas-Kanade (LK) method to provide a revised OF estimate having fractional pixel resolution.

24. A method of optical flow (OF) estimation, comprising:

acquiring a first frame of video and a second frame of video that provide at least one of temporally and spatially ordered images;

using a processor implementing a stored quasi-parametric optical flow measurement (QP-OFM) algorithm which combines a pyramidal block matching (PBM) method with a modified Lucas-Kanade (LK) method, the QP-OFM algorithm performing;

optical flow (OF) estimating between the first frame and the second frame using the PBM method to generate an initial OF estimate at a base pyramid level having integer pixel resolution, and refining the initial OF estimate using only one pass of the modified LK method to provide a revised OF estimate having fractional pixel resolution.

\* \* \* \* \*